United States Patent
Heyward et al.

(10) Patent No.: US 12,430,669 B2
(45) Date of Patent: *Sep. 30, 2025

(54) SYSTEM AND METHOD FOR SELECTING SPONSORED IMAGES TO ACCOMPANY TEXT

(71) Applicant: MediaLab.AI, Venice, CA (US)

(72) Inventors: Michael Heyward, Santa Monica, CA (US); Maarten Bosma, Santa Monica, CA (US); Samuel Brotherton, Los Angeles, CA (US); Charles DePue, III, Santa Monica, CA (US); Manuel Ernesto Gomez Contreras, Santa Monica, CA (US); Chase Evans, Los Angeles, CA (US)

(73) Assignee: MediaLab.AI, Venice, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,855

(22) Filed: Feb. 28, 2024

(65) Prior Publication Data

US 2024/0202780 A1    Jun. 20, 2024

Related U.S. Application Data

(63) Continuation of application No. 18/062,227, filed on Dec. 6, 2022, now Pat. No. 11,948,173, which is a
(Continued)

(51) Int. Cl.
*G06F 17/30* (2006.01)
*G06F 16/532* (2019.01)
(Continued)

(52) U.S. Cl.
CPC ....... *G06Q 30/0269* (2013.01); *G06F 16/532* (2019.01); *G06F 16/58* (2019.01);
(Continued)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS

8,090,779 B2 *  1/2012  Ludwig ............... H04L 51/04
                                                 709/206
8,132,116 B1 *  3/2012  Schendel ........... G06F 3/04817
                                                 715/764
(Continued)

*Primary Examiner* — Hung D Le
(74) *Attorney, Agent, or Firm* — White and Williams, LLP (57) ABSTRACT

A system for selecting an image to accompany text from a user in connection with a social media post. The system includes receiving text from the user; identifying one or more search terms based on the text; identifying candidate images from images in one or more image databases using the search terms, where the candidate images comprise a sponsored image; presenting one or more candidate images to the user, where the sponsored image is presented preferentially compared to other candidate images; receiving from the user a selected image from the one or more candidate images; generating the social media post comprising the selected image and the user-submitted text; and transmitting the social media post for display.

15 Claims, 6 Drawing Sheets

Related U.S. Application Data continuation of application No. 17/112,557, filed on Dec. 4, 2020, now Pat. No. 11,544,745, which is a continuation of application No. 15/704,845, filed on Sep. 14, 2017, now Pat. No. 10,885,557, which is a continuation of application No. 15/010,832, filed on Jan. 29, 2016, now Pat. No. 9,773,259, which is a continuation of application No. 14/508,088, filed on Oct. 7, 2014, now Pat. No. 9,286,326, which is a continuation-in-part of application No. 14/478,037, filed on Sep. 5, 2014, now Pat. No. 9,075,812.

(51) Int. Cl.

| | | |
|---|---|---|
| *G06F 16/58* | (2019.01) | |
| *G06F 16/583* | (2019.01) | |
| *G06F 16/9535* | (2019.01) | |
| *G06F 16/9536* | (2019.01) | |
| *G06F 16/9538* | (2019.01) | |
| *G06Q 30/0251* | (2023.01) | |
| *G06Q 50/00* | (2012.01) | |

(52) U.S. Cl.
CPC ...... *G06F 16/5838* (2019.01); *G06F 16/5846* (2019.01); *G06F 16/9535* (2019.01); *G06F 16/9536* (2019.01); *G06F 16/9538* (2019.01); *G06Q 50/01* (2013.01)

(58) Field of Classification Search
CPC ....... G05B 13/00; H03M 7/30; H04N 9/8042; G06T 9/00
See application file for complete search history.

(56) References Cited

U.S. PATENT DOCUMENTS

| | | | | |
|---|---|---|---|---|
| 8,799,278 | B2* | 8/2014 | Blount | G06F 16/9558 707/804 |
| 8,977,057 | B1* | 3/2015 | Smith | G06V 10/267 382/175 |
| 2002/0063725 | A1* | 5/2002 | Tarbutton | G06F 16/9577 707/E17.121 |
| 2003/0115286 | A1* | 6/2003 | Mayle | H04L 51/08 709/217 |
| 2005/0080751 | A1* | 4/2005 | Burningham | G07B 17/00193 705/401 |
| 2005/0162670 | A1* | 7/2005 | Shuler, Jr. | H04N 1/00408 358/1.2 |
| 2006/0064716 | A1* | 3/2006 | Sull | G06F 16/784 715/201 |
| 2006/0146137 | A1* | 7/2006 | Enos | H04N 1/00143 710/72 |
| 2007/0083597 | A1* | 4/2007 | Salesky | G06F 16/24 709/204 |
| 2009/0079750 | A1* | 3/2009 | Waxman | G06Q 10/107 345/581 |
| 2011/0029884 | A1* | 2/2011 | Grosz | G06F 3/14 715/835 |
| 2013/0318448 | A1* | 11/2013 | O'Shaugnessy | G06F 40/14 715/752 |
| 2014/0201178 | A1* | 7/2014 | Baecke | G06F 16/48 707/706 |

* cited by examiner

SYSTEM AND METHOD FOR SELECTING SPONSORED IMAGES TO ACCOMPANY TEXT

CROSS-REFERENCE TO RELATED APPLICATIONS

This application is a Continuation of U.S. patent application Ser. No. 18/062,227, filed Dec. 6, 2022, now U.S. Pat. No. 11,948,173, which is a continuation of U.S. patent application Ser. No. 17/112,557, filed Dec. 4, 2020, now U.S. Pat. No. 11,544,745, which is a continuation of U.S. patent application Ser. No. 15/704,845, filed Sep. 14, 2017, now U.S. Patent No. 10,885,557, which is a continuation of U.S. patent application Ser. No. 15/010,832, filed Jan. 29, 2016, now U.S. Pat. No. 9,773,259, which is a continuation of Ser. No. 14/508,088, filed Oct. 7, 2014, now U.S. Pat. No. 9,286,326, which is a Continuation In Part of U.S. Non-Provisional application Ser. No. 14/478,037 filed Sep. 5, 2014, which is incorporated by reference in its entirety.

BACKGROUND

In the age of social media, multimedia messages containing both text and images may convey thoughts and ideas to others, including social or business contacts or to a larger audience. Selecting an appropriate image to pair with text provided by a user may be a challenging and laborious process, given the large number of images available to an internet user.

Other methods of searching for images require the user to select or identify discrete search terms to find the image and/or search amongst all images on the internet. As users become accustomed to the process of creating a multimedia message where the image is suggested by a service, opportunities arise for customization in ways that could benefit publishers, photographers, advertisers, or anyone with a financial, aesthetic, or editorial interest in influencing the images suggested to the user while creating their multimedia message.

Accordingly, an automated method for suggesting and choosing images to pair with a user's text may be desirable. A service to publish and share such thoughts, and to track them so that images for future thoughts may be better chosen, may be similarly desirable.

SUMMARY OF THE INVENTION

A system for selecting an image to accompany text from a user in connection with a social media post. The system includes receiving text from the user; identifying one or more search terms based on the text; identifying candidate images from images in one or more image databases using the search terms, where the candidate images comprise a sponsored image; presenting one or more candidate images to the user, where the sponsored image is presented preferentially compared to other candidate images; receiving from the user a selected image from the one or more candidate images; generating the social media post comprising the selected image and the user-submitted text; and transmitting the social media post for display.

DETAILED DESCRIPTION OF THE INVENTION

Figure 1:
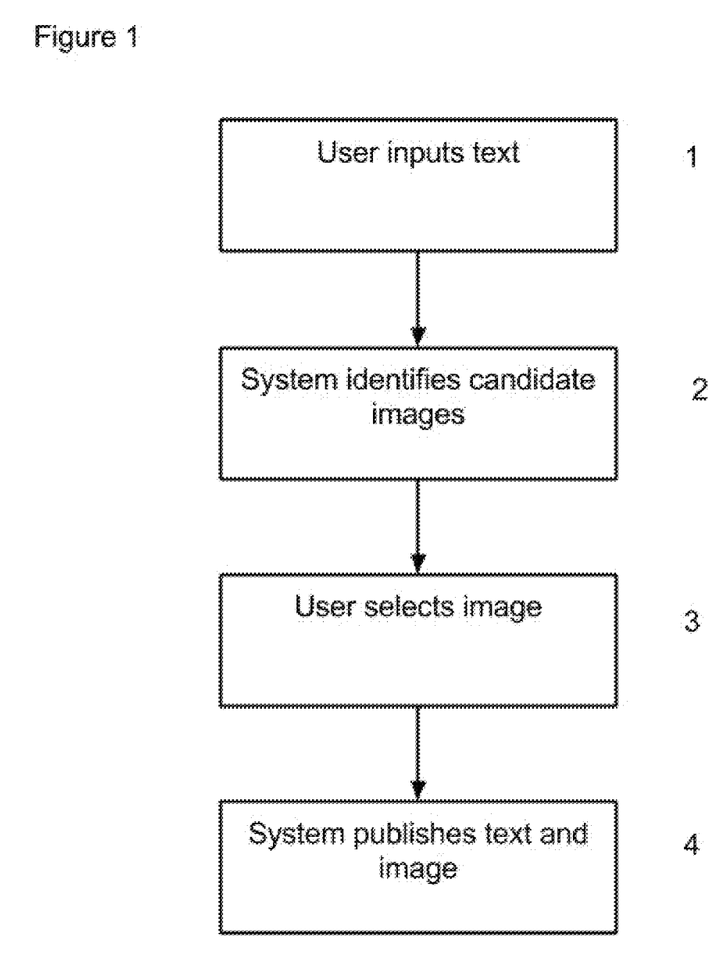
FIG. 1 is a flow chart of creation of a post in accordance with one aspect of the present invention.

FIG. 1 is a flow chart of creation of a post in accordance with one aspect of the present invention. A "post" may be text displayed along with media, where the text and/or media may be supplied by the user. The media may be an image, video, and/or audio. The post may include associated search terms that may be supplied by the user and/or generated by the system. Some or all of the post may be created by a user and may be published so as to be viewable by the user and possibly others. In Step 1 of the post creation process shown in FIG. 1, the user may input text. In one aspect, the user may optionally also input one or more search terms relating to the post. In another aspect, the system may select search terms based on the text, and the user may optionally edit or add search terms. Each search term may be one or more words included in or associated with the post. In Step 2, based on one or more of the text, the search terms, and posts by the user and/or other users, the system may identify candidate images to accompany the post. This identification process is described in more detail below. In Step 3, the user may select one of the candidate images or may select or input another image. In Step 4, the user finalizes the post and publishes it using the system.

Figure 2:
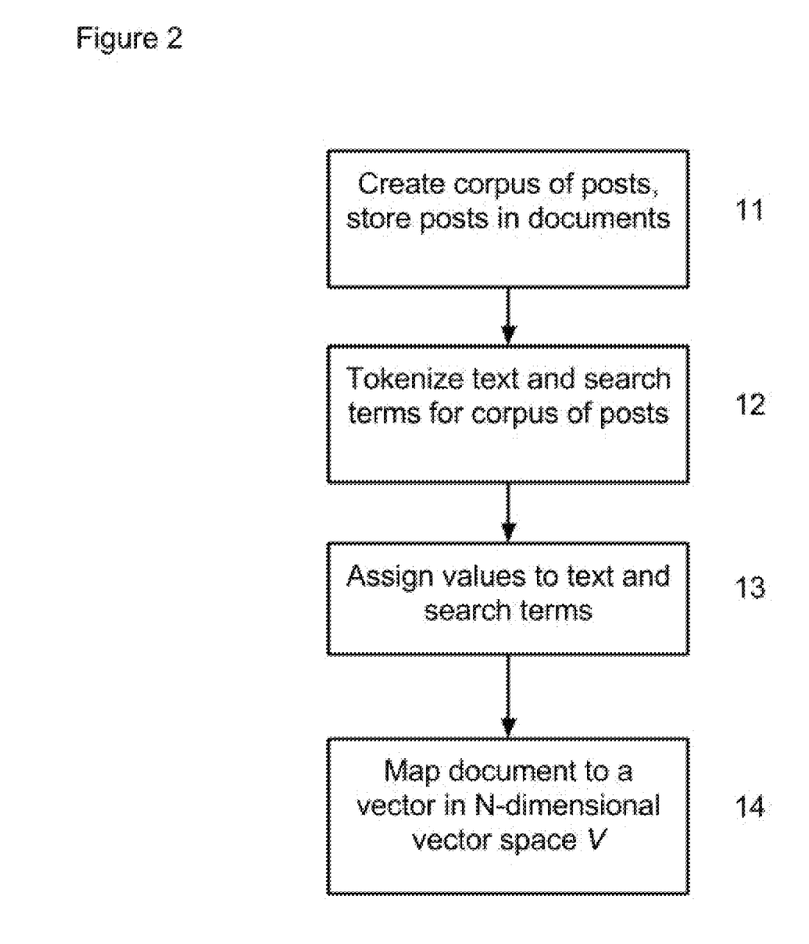
FIG. 2 is a flow chart of a configuration process in accordance with one aspect of the present invention.

FIG. 2 is a flow chart of a configuration process wherein a corpus of posts are built that may be used to identify one or more candidate images to associate with text in future posts. In Step 11, the system may access or compile posts, for example posts for which the system has text and search terms. The text and corresponding search terms for a post may be stored in a document. In Step 12, each post may be tokenized into the individual words in the post. Step 12 may include the removal of stop words (which may include certain short or less critical words such as "the," "is," "at," "which," and "on") and/or may include the normalization of ASCII emoticons in the post. In one aspect of the invention, the system may perform stemming to reduce words to their stem (or base, or root) form for better evaluation. In Step 13, each word may be assigned a positive integer value. In one aspect, the words may be assigned an integer value without regard to the case of the letters with which the word was written (e.g. Sample, sample, and SAMPLE would receive the same integer value). In Step 14, each document d may be mapped to a vector $v=f(d)$ in an N-dimensional vector space V, where N may be, in one aspect, the number of distinct positive integers in the document or any set of unique values could be used as a vector space. $f$ may be a function that receives a sentence/document d and outputs a vector where the value of each word $b\_i$ may be the number of times $b\_i$ appears in d multiplied by the fraction of 1/(the number of times $b\_i$ appears in the entire corpus). This process is known as bag-of-words representation, weighted by TF-IDF, also known as term frequency-inverse document frequency. This process helps identify unusual or less-common words that may be indicative or unique thoughts in the text, while ignoring more commonly occurring words.

Figure 3:
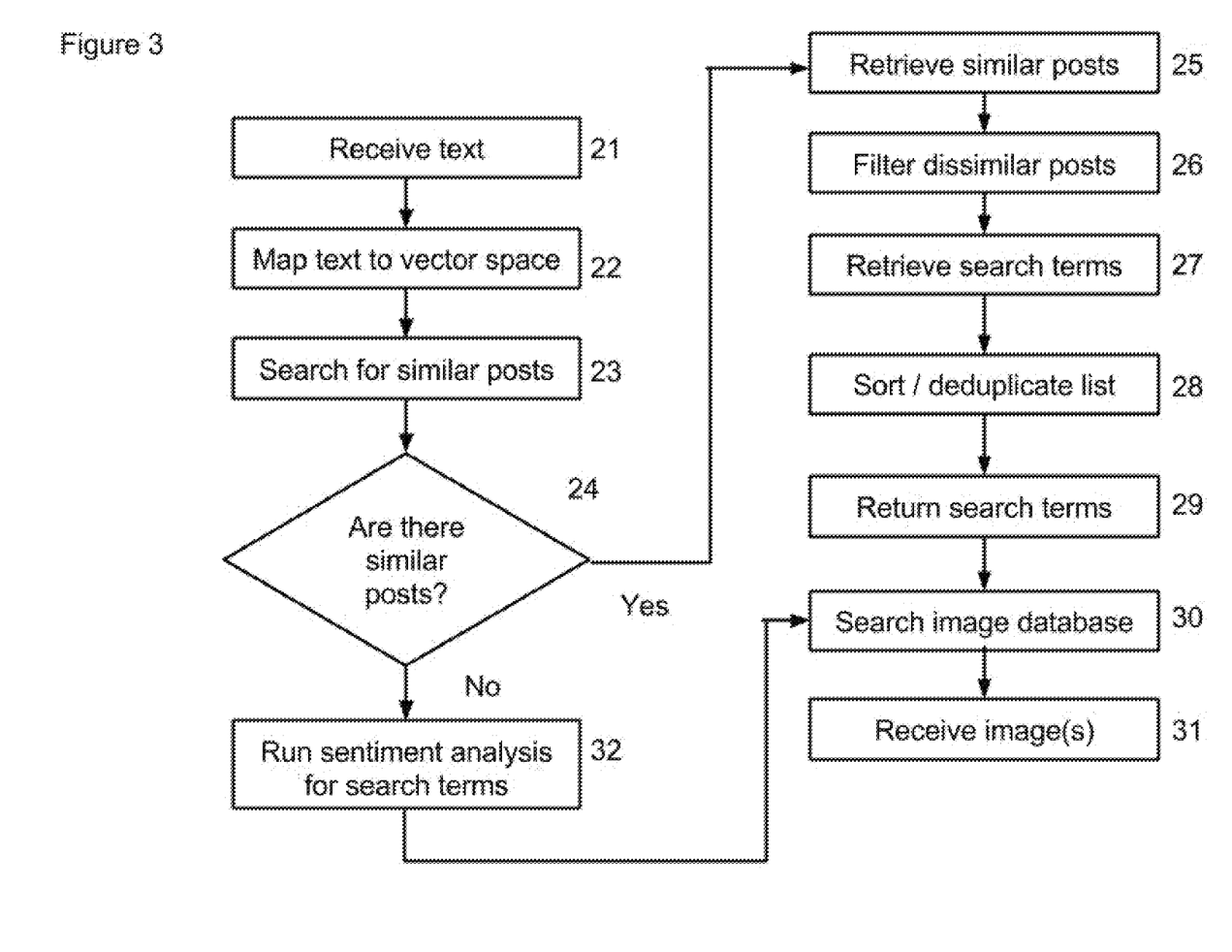
FIG. 3 is a flow chart of an image identification and selection process in accordance with one aspect of the present invention.

Once the corpus is built, it may be used to find prior posts similar to the new post currently being submitted to the system, so that similar images can be located and presented to the user creating the new post. FIG. 3 is a flow chart depicting the image identification and selection process after text for a new post has been submitted by the user. In Step 21, the text of the post may be sent from the user client to the server. In one aspect, the system, including the methods depicted herein, may run on a server, and the server may periodically communicate with a plurality of clients allowing users to read and write posts. In Step 22, the text of the submitted post may be mapped to vector space V to identify similar posts. This may be the same vector space as discussed with reference to Step 14 in FIG. 2. In Step 23, the system searches for similar posts in the corpus. In accordance with one aspect of the invention, this list may include a predetermined number of most similar posts, e.g., 100, or may use another threshold determining factor to identify similar posts. The similar posts may be limited to those with known search terms. In accordance with one aspect, similar posts are identified using cosine similarity as the distance function (i.e., the measure of the angle between the two vectors representing the two posts). In Step 24, the system determines whether a threshold number of similar posts exist. If not ("No", Step 24), then in Step 32 the system may perform a sentiment analysis on the post text that will output a sentiment of the content of the text. In one aspect, if the sentiment analysis deems the text to have a positive emotional sentiment, then the sentiment analysis may output positive emotional terms such as "sunlight" and "smile". If the sentiment analysis deems the text to have a negative emotional sentiment, then the sentiment analysis may output negative emotional terms such as "cold" and "dark". The output of the sentiment analysis may be saved as search terms to correspond with the post. Once those search terms are known, the system may perform a search on one or more image provider databases using the search term(s) in Step 30, and the resulting candidate images are received in Step 31.

If similar, the results from a similarity search exist ("Yes", Step 24), then in step 25, a list of the most similar posts with known search terms may be retrieved. Once the list of similar posts is received, the least similar posts are removed from the list in Step 26. This may be done by generating a similarity score. In one aspect, posts with a similarity score below a predetermined threshold, e.g., less than 0.5, will be removed. In another aspect, relative thresholds may be used such that posts are only considered similar if they are within a relative threshold of similarity to the best matching similar post. In another aspect, a post can be considered to have a greater degree of similarity to another post based on multiple appearances of the same search term. For each post with a similarity score over the threshold, the search terms of that post, which may have been defined by the user who published the post or by another entity, are retrieved in Step 27. In Step 28, the list of search terms may be sorted by the number of times each search term occurs in all of the remaining similar posts and the list may be de-duplicated. In Step 29, a number (e.g., four) of search terms present most often in the most similar posts may be returned. Once those search terms are selected, a search may be run on image provider databases using the search term(s) with the highest similarity score(s) in Step 30, and the resulting candidate images are returned in Step 31.

Candidate images may be displayed to the user on the client device, during the search and/or after the search is completed. The user may preview a candidate image with the user's accompanying text. In one aspect, the system may track the use of images. The system may eliminate as candidates certain images, for example, images that have been selected by users for use with posts more than a predetermined number of times, within a predetermined time period and/or geographic region.

In one aspect, the system presents the user with one or more alternative candidate images from which the user may further choose. Alternative candidate images may be presented in the order they are returned from the image service. In another aspect, the alternative candidate images may be derived from the search terms and may be sorted by characteristics such as accessibility, size, and/or speed of retrieval. For example, images may be retrieved faster via HTTP than HTTPS, and smaller images may load faster than larger images. Accessibility may be determined, for example, by retrieving the image, by sending a "HEAD" HTTP command, or by making a TCP socket connection to the server.

Once the user selects an image, the user may decide to publish the post, after which the post may be added to the corpus of posts in accordance with FIG. 2. The image that was published with the post, or a link (e.g., a URL) thereto, may also be stored. As discussed above, the source image (and/or a link) may also be stored for the purposes of prohibiting repeated frequent use of that image, e.g., by region and/or by user.

Figure 4:
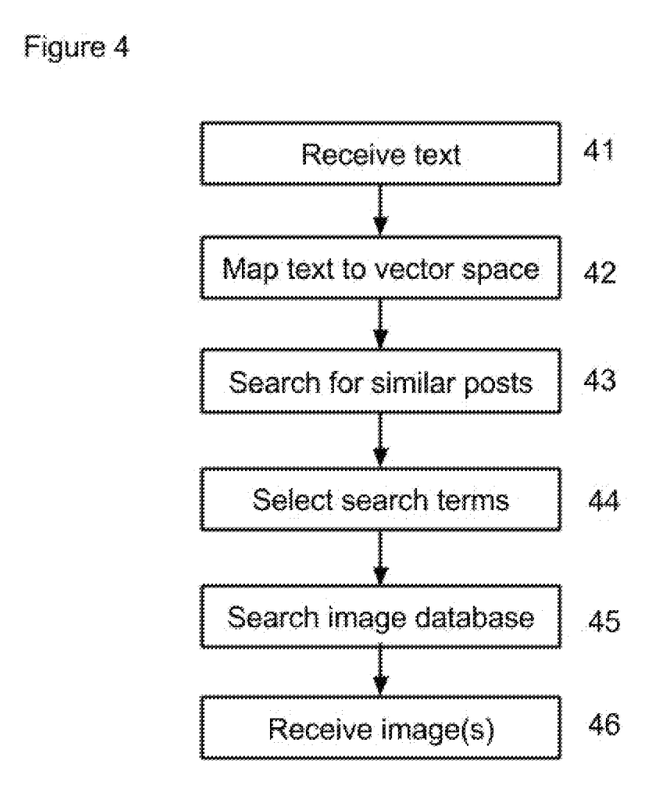
FIG. 4 is a flow chart of an image identification and selection process in accordance with one aspect of the present invention.

FIG. 4 is a flow chart depicting another image identification and selection process after text for a new post has been submitted by the user. In Step 41, the text of the post may be sent from the user client to the server. In one aspect, the system, including the methods depicted herein, may run on a server, and the server may periodically communicate with a plurality of clients allowing users to read and write posts. In Step 42, the text of the submitted post may be mapped to vector space V to identify similar posts. This may be the same vector space as discussed with reference to Step 14 in FIG. 2. In Step 43, the system searches for similar posts in the corpus. In accordance with one aspect of the invention, this list may include a predetermined number of most similar posts, e.g., 100, or may use another threshold determining factor to identify similar posts. The similar posts may be limited to those with known search terms. In accordance with one aspect, similar posts are identified using cosine similarity as the distance function (i.e., the measure of the angle between the two vectors representing the two posts). In Step 44, the system selects search terms from the similar posts. In so doing, the system may not select as search terms certain words deemed unhelpful or non-informational. Once search terms are selected, a search may be run on image provider databases using the search term(s) with the highest similarity score(s) in Step 30, and the resulting candidate images are returned in Step 31.

Figure 5:
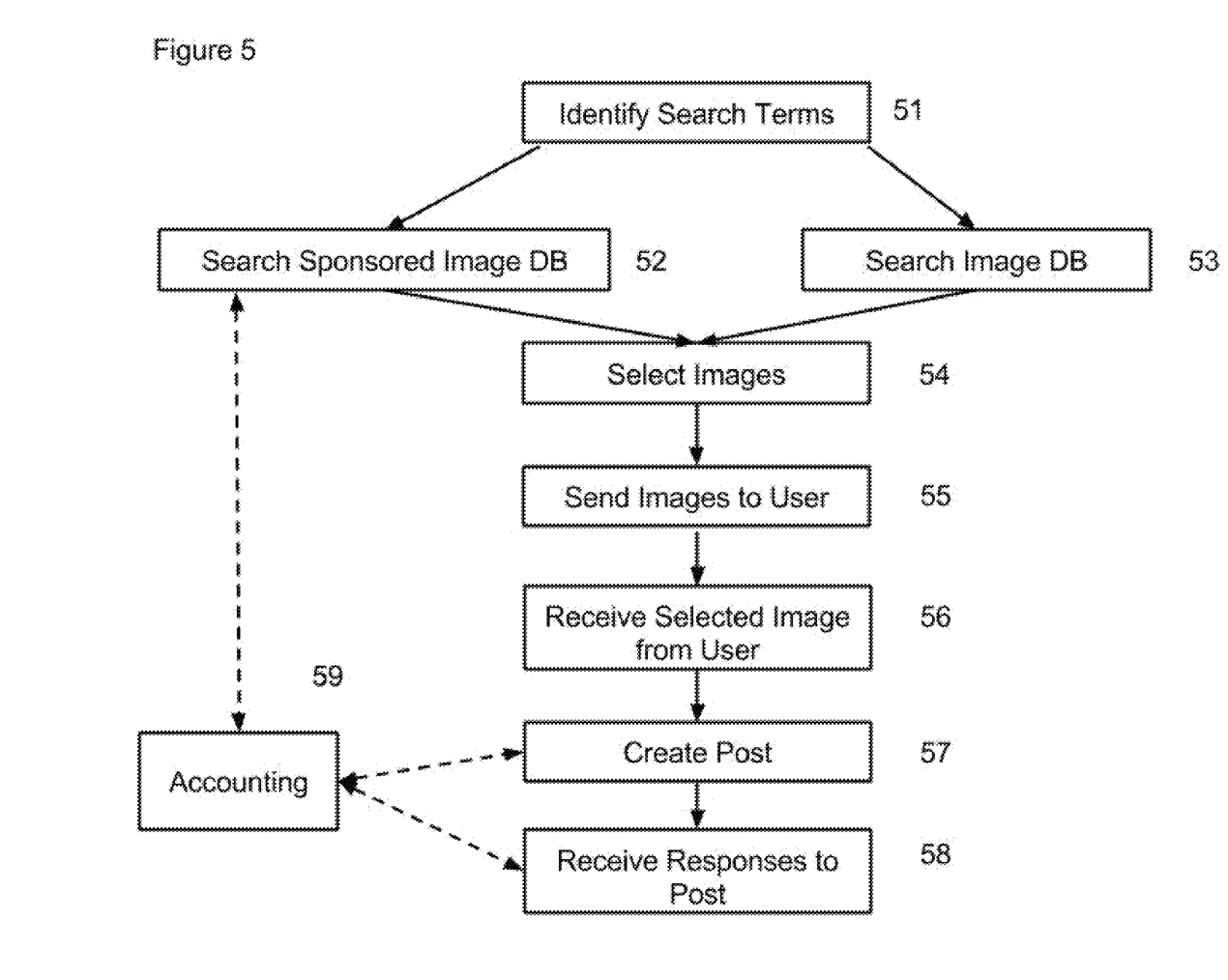
FIG. 5 is a flow chart of an image identification and selection process in accordance with one aspect of the present invention.

FIG. 5 is a flow chart depicting another image identification and selection process after text for a new post has been submitted by the user. As described above, the user may input or select and/or the system may identify search terms based on text submitted by the user, as shown in Step 51 of FIG. 5. The system may then search databases in Steps 52 and 53. Step 52 may occur before, after, in parallel with, or instead of the search in Step 53. In Step 53, the system searches one or more image databases as described above. In Step 52, the system searches a sponsored database populated with images provided by, approved by or otherwise associated with third-party advertisers. Each image may be associated with one or more search terms. In another aspect, instead of or in addition to searching based on search terms, the system may search based on one or more other factors including, geographic location of the user, time of day, week, month or year, calendar event, geographic and/or temporal data relating to nearby activities or events, and user-dependent properties including information associated with previous posts from the user.

In Step 54, the system selects candidate images from databases, then sends those candidate images to the user at Step 55. In one aspect, sponsored candidate images may be displayed to the user first, ahead of, in a preferential position or in a specified proportion compared to non-sponsored candidate images. In one non-limiting example, images in the databases may have corresponding information, such as geographic or temporal information. Continuing that example, when the system receives text for a post by a user located near a professional sporting arena while a sporting event is taking place, the system may select as candidate images those images relating to the sporting event instead of or in additional to images based on search terms. In Step 56, the system receives information identifying a selected image from the user. In Step 57, the system creates and publishes a post as described above. In Step 58, the system may receive responses to the post from the creating user or other users. Responses may include indications of attention or interest from other users. Responses may include indications that a user "likes" or "favorites" the post. Responses may include "Reply posts" created by users that are linked to the original post, personal messages, and requests to chat with the posting user. Responses may include "shares", where users share the post with others, e.g., via email, instant or text message, social media or other outlet.

At Step 59, the system may perform accounting related to the sponsored images and posts containing those images. For example, the system may track instances when sponsored images are presented as candidates to users, instances when sponsored images are selected for use in posts, responses to posts containing sponsored images, and the number of times those posts are viewed via web and/or mobile. Such tracked information may be considered advertising impressions and may be used to invoice advertisers. The system may track the number of keywords from a campaign. A campaign may include one or more images associated with an advertiser and may include one or more keywords associated with each of the one or more images. The system may report posts containing sponsored images to advertisers, and advertisers may receive rights to reproduce those posts.

In one aspect, the system may treat reply posts similarly to original posts and perform the selection steps described above. In another aspect, the system may treat reply posts differently from original posts. In that aspect, when a second user creates a reply post to an original post, where the original post uses a sponsored image, then the system may automatically suggest one or more sponsored images as candidate images to the second user for use in the reply post. In one aspect, the system may suggest one or more candidate images to the reply post where the candidate images are associated with the image used in the original post and/or with a sponsor or campaign associated with the image used in the original post.

Figure 6:
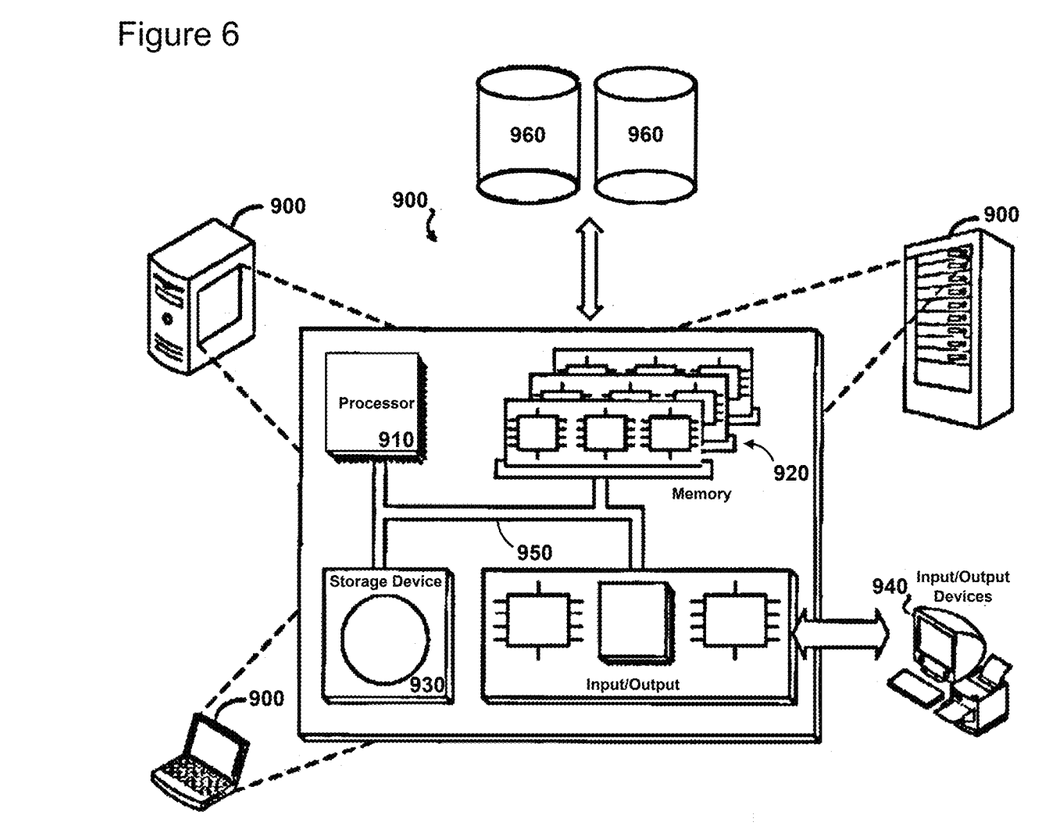
FIG. 6 is a diagram displaying a computer on which the system and method of the present disclosure may be implemented according to an aspect of the present disclosure.

FIG. 6 shows a general purpose computer on which the system and method of the present disclosure may be implemented. The computer system 900 may execute at least some of the operations described above. Computer system 900 may include processor 910, memory 920, storage device 930, and input/output devices 940. Some or all of the components 910, 920, 930, and 940 may be interconnected via system bus 950. Processor 910 may be single or multi-threaded and may have one or more cores. Processor 910 may execute instructions, such as those stored in memory 920 or in storage device 930. Information may be received and output using one or more input/output devices 940.

Memory 920 may store information and may be a computer-readable medium, such as volatile or nonvolatile memory. Storage device 930 may provide storage for system 900 and may be a computer-readable medium. In various aspects, storage device 930 may be a flash memory device, a floppy disk device, a hard disk device, an optical disk device, or a tape device.

Input/output devices 940 may provide input/output operations for system 900. Input/output devices 940 may include a keyboard, pointing device, and microphone. Input/output devices 940 may further include a display unit for displaying graphical user interfaces, speaker, and printer. External data may be stored in accessible external databases 960.

The features described may be implemented in digital electronic circuitry, or in computer hardware, firmware, software, or in combinations thereof. The apparatus may be implemented in a computer program product tangibly embodied in an information carrier, e.g., in a machine-readable storage device or in a propagated signal, for execution by a programmable processor; and method steps may be performed by a programmable processor executing a program of instructions to perform functions of the described implementations by operating on input data and generating output.

The described features may be implemented in one or more computer programs that are executable on a programmable system including at least one programmable processor coupled to receive data and instructions from, and to transmit data and instructions to, a data storage system, at least one input device, and at least one output device. A computer program may include set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors of any kind of computer. Generally, a processor may receive instructions and data from a read only memory or a random access memory or both. Such a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable, disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks may include, e.g., a LAN, a WAN, and the computers and networks forming the Internet.

The computer system may include clients and servers. A client and server may be remote from each other and interact through a network, such as the described one. The relationship of client and server may arise by virtue of computer programs running on the respective computers and having a client-server relationship to each other.

Numerous additional modifications and variations of the present disclosure are possible in view of the above teachings. It is therefore to be understood that within the scope of the appended claims, the present disclosure may be practiced other than as specifically described herein.

What is claimed is:

1. A system for selecting an image to accompany text from a user in connection with a social media post, comprising a processor and a tangible storage medium, said tangible storage medium comprising code executable by the processor for performing steps comprising:
    a) receiving text from the user;
    b) identifying one or more search terms based on the text;
    c) identifying a set of candidate images from images in one or more image databases using the search terms, where the set of candidate images comprises a sponsored image;
    d) eliminating an image from the set of candidate images based on an elimination factor;
    e) presenting at least a subset of the set of candidate images to the user, where the sponsored image is presented in a preferential position compared to other candidate images, and further presenting a preview to the user of one of the subset of the set of candidate images with the text;
    f) receiving from the user a selected image from the set of candidate images;
    g) generating the social media post wherein the social media post is of a similar size and of a similar shape as the selected image, and wherein the social media post comprises the text displayed superimposed on the selected image; andh) transmitting the social media post for display.

2. The system of claim 1, wherein step f) further comprises storing information relating to the selected image including one or more of an image identifier, time/date of use, use occurrence, and geographic location of the user.

3. The system of claim 1, wherein the elimination factor comprises one or more of time of use of the image, date of use of the image, frequency of use of the image, and geographic location of the user.

4. The system of claim 1, wherein the user-submitted text further comprises one or more search terms and step b) comprises identifying those search terms.

5. The system of claim 1, wherein step b) comprises generating search terms based on the user-submitted text.

6. The system of claim 1, wherein step e) further comprises presenting a predetermined number of sponsored images.

7. The system of claim 1, wherein step e) further comprises presenting sponsored images in a predetermined proportion to other images.

8. The system of claim 1, wherein the selected image is the sponsored image, and further comprising step i) accounting views of the social media post by other users in connection with the sponsored image, a campaign, or a third-party associated with the sponsored image.

9. The system of claim 1, wherein the selected image is the sponsored image, and further comprising step i) receiving responses to the social media post and accounting those responses in connection with the sponsored image, a campaign, or a third-party associated with the sponsored image.

10. The system of claim 9, wherein the response comprises a like, favorite, reply, personal message, or request to chat with the user.

11. The system of claim 1, wherein the selected image is the sponsored image and further comprising:
    i) receiving from a second user a request to reply to the social media post and receiving text from the second user; and
    j) presenting one or more candidate images to the second user, where a second sponsored image is presented preferentially compared to other candidate images, and wherein the second sponsored image is linked to a sponsor or campaign associated with the sponsored image.

12. The system of claim 11, further comprising:
    k) receiving from the second user a second selected image from the one or more candidate images;
    l) generating the social media reply post comprising the second selected image and the second user-submitted text; and
    m) transmitting the social media reply post for display.

13. A system for selecting an image to accompany text from a user in connection with a social media post, comprising a processor and a tangible storage medium, said tangible storage medium comprising code executable by the processor for performing steps comprising:
    a) receiving text and geographic location information from the user;
    b) identifying one or more search terms based on the text;
    c) identifying candidate images from images in one or more image databases using the search terms and the geographic location information, where the candidate images comprise a sponsored image;
    d) presenting one or more candidate images to the user, where the sponsored image is presented in a preferential position compared to other candidate images, and further presenting a preview to the user of one of the subset of the set of candidate images with the text;
    e) receiving from the user a selected image from the one or more candidate images and storing information relating to the selected image including one or more of an image identifier, time/date of use, use occurrence, and geographic location of the user;
    f) generating the social media post wherein the social media post is of a similar size and of a similar shape as the selected image, and wherein the social media post comprises the text displayed superimposed on the selected image; and g) transmitting the social media post for display.

14. The system of claim 13, wherein the selected image is the sponsored image and further comprising:

h) receiving from a second user a request to reply to the social media post and receiving text from the second user; and i) presenting one or more candidate images to the second user, where a second sponsored image is presented preferentially compared to other candidate images, and wherein the second sponsored image is linked to a sponsor or campaign associated with the sponsored image.

15. The system of claim 14, further comprising:

j) receiving from the second user a second selected image from the one or more candidate images;

k) generating the social media reply post comprising the second selected image and the second user-submitted text; and l) transmitting the social media reply post for display.

* * * * *